Nov. 25, 1952      A. IEZZI      2,618,815

METHOD OF APPLYING WALL FINISHES

Filed March 17, 1949

INVENTOR.
ALFRED IEZZI
BY
William J. Ruano
ATTORNEY

Patented Nov. 25, 1952

2,618,815

UNITED STATES PATENT OFFICE 2,618,815

METHOD OF APPLYING WALL FINISHES

Alfred Iezzi, Reading, Pa.

Application March 17, 1949, Serial No. 82,011

4 Claims. (Cl. 18—61)

This invention relates to a method for applying a plaster or cement coating to a wall in a manner so as to give the wall the appearance of being built up of pieces of stone, cement blocks or similar construction units. The present application is a continuation-in-part of my earlier co-pending application Serial No. 26,950, filed May 14, 1948, now Patent No. 2,513,648 issued July 4, 1950, on "Method and Apparatus for Applying Wall Finishes."

A common method of applying a stone-like finish to a wall is that disclosed in U. S. Patent No. 1,888,234 to E. J. Miller, issued November 22, 1932, wherein a tool including a plunger slidable in a container is employed. The working surface of the plunger is molded in the shape of a stone surface so that when the container is filled with a cementitious plastic material and the plunger is forcibly pressed within the container against a section of wall, the plastic material is forced therefrom and is molded into the shape of a stone block. An outstanding disadvantage of such device is that it is complicated in construction, cumbersome, heavy and requires the exertion of substantial manual pressure. Moreover, wax paper is required to cover the face of the plunger to prevent adhesion of the plastic material thereto upon withdrawal of the plunger, which paper often wrinkles and leaves wrinkled impressions. Furthermore, since the plastic block or section against which pressure is exerted is completely concealed by the plunger-receiving container, it is difficult to determine when the plastic material has been properly positioned and properly molded so as to permit withdrawal of the plunger and removal of the mold, particularly under varying weather conditions.

An object of the present invention is to provide a novel method for applying wall finishes to simulate stone blocks or cut pieces, which method is devoid of the disadvantages of prior art methods such as that described hereinabove.

A more specific object of this invention is to provide a novel method for applying stone-like finishes to walls which permits visual indication of the plastic material being molded at all times so that it can be readily determined when the material has been molded properly or has set, that is, separated sufficiently from the mold, to allow withdrawal of the mold.

Another object of this invention is to provide a novel process for molding plastic material on a wall surface in a manner so as to simulate stone blocks of different sizes and shapes, which method is very simple and requires a minimum amount of time and yet provides a wall surface which simulates a stone wall to such an extent that it cannot be readily distinguished from a natural, cut stone wall.

A more specific object of this invention is to provide a novel process for molding cementitious plastic material on a wall surface to give a stone-like finish to the wall, which method is exceedingly rapid and includes coating the inner surfaces of the molds with layers of materials to provide a natural stone-like finish to the wall as well as to provide easy separation of the molds immediately after they have been filled with plastic material and pressed against the base coating on the wall, and whereby contiguous areas of the wall are molded in succession by differently shaped molds.

Other objects and advantages of the present invention will be apparent from a study of the following specification and drawings wherein.

Figure 2:
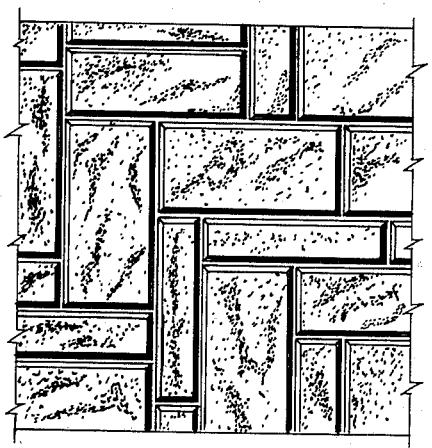
Fig. 2 is an elevational view of a finished wall, the individual blocks of which have been shaped by molds similar to that shown in Fig. 1 and of different sizes.
Figure 3:
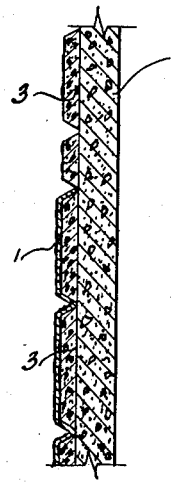
Fig. 3 is a longitudinal cross-sectional view of the wall shown in Fig. 2 and illustrating forms as applied to certain wall block sections and removed from others to expose the finished wall surface.
Figures 1, 4:
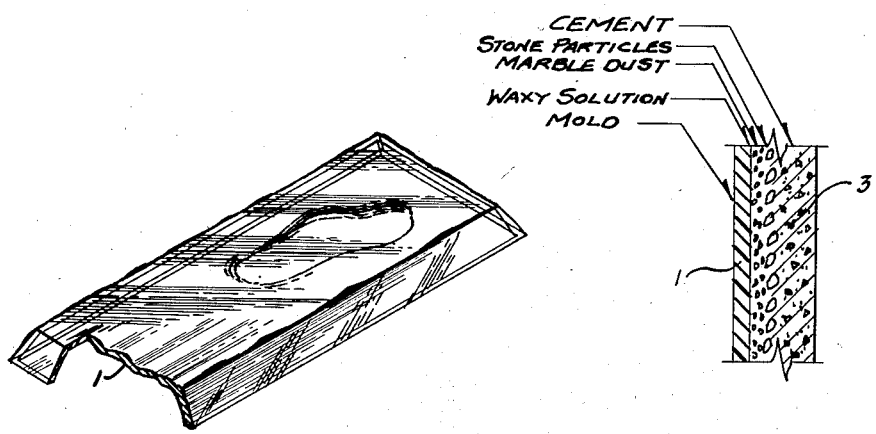
Fig. 1 is a view of a transparent plastic mold or form shown partly broken away and having the shape of a stone block and embodying the principles of the present invention.
Fig. 4 is an enlarged fragmentary, longitudinal cross-sectional view of the mold and contents thereof when applied to a wall surface.

As described in my co-pending application referred to hereinabove, molds or forms are provided, preferably of rectangular outline and having surfaces shaped so as to simulate stone surfaces. These forms are somewhat dish-shaped and may be made by master dies. They preferably have very smooth or glossy surfaces to prevent adherence of the plastic material thereto. They are preferably made of plastic material, particularly transparent plastic, such as of vinyl polymers (for example, Vinylite), or any other transparent plastic material having a smooth, glass-like surface. I prefer the lighter, unbreakable, and somewhat flexible plastic materials and to make them of sufficient thickness, say of the order of ¼ inch, so that they will not break on dropping on the ground, etc. Lucite is an outstanding material and has many remarkable characteristics making it suitable for this purpose, such as its resistance to pitting and breakage.

I provide a set of forms, preferably of different rectangular configuration and size, perhaps ranging in size from 2" x 8" to 8" x 24", which different sizes are interfitted in contiguous relationship in a manner so as to give a wall the appearance of being made up of blocks of cut stone of different sizes and shapes as is commonly found in natural stone walls. For instance, as shown in the aforementioned co-pending application, about 21 form units may be fitted in a haphazard pattern to cover a rectangular area of 1 square yard, and a complete set of forms may consist of 105 form units covering 5 square yards of wall surface, which is a convenient area to be covered at one time. It should be understood, however, that the above specified sizes and numbers of forms to cover a given area are merely illustrative of convenient sizes and areas to be covered in succession, it being readily apparent that larger or smaller sizes may be equally suitable, and a different sized area may be covered at one time.

A wall may be built up by applying an under coating of plaster or cement on lathe made of metal or other suitable material or directly on concrete blocks, stone or stucco wall, or other base surface. This undercoating is allowed to set about 48 hours, or at least until sufficiently hardened to permit application of a finishing coating. A second or finishing coating of plaster, cement, stucco or similar material is applied by means of my improved molds. A suitable mixture for such finishing coating may comprise 1½ parts sand, 1 part cement (such as White Atlas cement), and ½ part mortar mix, by volume. Water is added to this mixture so as to make it plastic.

One method of applying the plastic material to the wall is to fill the above-described plastic molds with the plastic finishing mixture 3 described hereinabove, and then press the various filled molds against the base coating 2 of the wall, applying pressure and a slight lateral movement to the mold while it is held against the base surface so that the plastic contents of the mold will adhere to the base coating and so that any excess plastic material originally contained in the mold will be pressed out sidewise. The molds filled with plastic material are applied successively and in contiguous relationship on a wall and are left on the wall, without manual support, long enough to allow the finishing plastic coat to harden or set. In view of the fact that the molds are made of transparent plastic material, it will be very easy to visually determine when the molded plastic has set or become sufficiently separated from the molds to permit removal of the molds. In some cases, they may be removed after partial setting. The time the molds should remain seated on the undercoating material to allow setting varies in accordance with weather conditions and may be of the order of three hours. Retention of the molds on the wall for this period of time prevents rapid dehydration and allows formation of a hard finish.

A second and speedier method of applying molded sections to the base coating is to first coat the inner wall surfaces of the respective molds with a suitable adhesive coating material, such as for example, a mixture of paraffin (or tallow) and kerosene. This mixture may be made from ordinary candles, that is, by melting wax candles and adding about 5 parts of kerosene to 1 part of paraffin (or tallow), by volume. However, these relative amounts are not critical, it being sufficient to form a solution which is substantially in liquid form so that it may be readily applied by a brush on the inner surfaces of the respective molds. Other solid fats, waxes or adhesive coatings may be used instead.

After a coating of the paraffin-kerosene solution is applied on the inner surfaces, marble dust, quartz particles or the like are spread or dusted on this coating and become adhered thereto. Upon this coating of marble dust or particles there may be spread a coating or partial coating of ground up stone particles of the particular stone which it is desired to imitate. For example, if it is desired for the wall to have the appearance of sandstone, sandstone rocks are broken up or ground into small particle size, not necessarily powder, preferably a mixture of powder and small particles. These particles are spread in the form of streaks across the inner face of the stone to give the outer surface of the molded section the appearance of having strata or layer formation. Upon this layer of actual stone particles the above-described finishing plastic coating is laid in an amount so as to fill the plastic mold. The mold is then pressed against the base coating on the wall with a slight lateral movement so as to form a clear mold impression and so as to adhere the molded section of the finishing plastic coating to the base coating. The mold is then immediately removed inasmuch as the marble dust formed on the paraffin-kerosene coating permits a ready removal from the molded portion without the necessity of waiting for the molded portion to harden or set. In some cases a mixture of marble dust and stone particles may be used instead of separate layers. Thus the wall may be built up by successively applying molds of different sizes and shapes in contiguous relationship and immediately removing the molds after the impression is made on the finishing plastic layer. For example, 21 molds of different shape and size covering about 1 square yard may be applied in succession as described in my co-pending application hereinbefore referred to. The same pattern or different patterns may be applied to succeeding areas of 1 square yard or so to avoid as much as possible any appearance of repetition of the pattern. Of course, a different number of molds and a different base area may be used instead, such as one greater than 1 square yard.

By the above-described method the surface of the molded plastic coating of the wall imitates stone to a remarkable degree and, in fact, cannot be distinguished from actual stone. The method comprises a substantial improvement over methods wherein colors are added to a cement mixture in an endeavor to make it look like stone. A large amount of the marble dust adheres to the surface of the molded sections so as to give it a lustre resembling that of a stone wall. The paraffin prime coating in part adheres to the outer surface of the molded sections and thereby prevents rapid dehydration of the molded sections, allowing them to become very hard. If desired, the molds may be left on during a portion or all of the setting period to permit even slower dehydration. The paraffin coating also provides a protective covering which will protect the finished wall from the deleterious effects of water and chemicals in the atmosphere, that is, to prevent chemical reaction with the salts in the stone causing crumbling or decay of the surface. If desired, an additional outer coating of the paraffin solution may be applied so as to further protect the wall from the effects of the atmosphere, rain, etc. Such outer coating may consist of other, water-proof, sealer material, such as that known in the trade as Uncle Hiram's Terrazzo Sealer made by New Method Varnish Company, Elmira, New York.

While I have described the use of plastic molds of transparent material, it will be readily apparent that particularly for the second described method other materials, such as opaque plastic material, metal such as aluminum or alloys, or the like may be used instead for carrying out the process set forth in the second above-described method, that is, the method whereby the molds are immediately removed from the molded wall sections before the finishing plastic coating is permitted to harden or set.

Thus it will be seen that I have provided a novel, efficient and relatively simple method for applying plastic, stone-like finishes to wall surfaces wherein light molding elements are used and wherein the molds may be either left on during setting of the molded sections or quickly removed from the molded sections immediately after the mold impressions are made, and whereby stone-like wall surfaces are obtained which imitate to a remarkable degree natural stone wall. It will be apparent that instead of making the molds of rectangular shape, they may be, instead, made trapezoidal, triangular, or of other shapes or combinations of shapes, as desired. They may be shaped and used also for making brick walls instead of stone walls.

While I have described certain specific methods for carrying out my invention, it will be understood that these are merely by way of illustration only, and that various changes and modifications may be made within the contemplation of my invention and within the scope of the following claims.

I claim:

1. The method of applying a coating of plastic material on a wall surface so as to simulate stone, comprising coating the interior surface of a stone shaped mold with a waxy solution, sprinkling and adhering small particles of stony-material on said waxy solution coating, filling said mold with cementitious plastic material, pressing the mold and plastic material against the wall surface with slight lateral movement and sufficient pressure to effect penetration of a coating of said solution on the outer surface of the molded plastic material, and finally immediately removing the mold before the plastic material has set.

2. The method of applying a coating of plastic material on a wall surface so as to simulate stone, comprising brushing the interior surface of an imperforate stone shaped mold with a wax solution, sprinkling and adhering marble dust and ground up stone particles of the particular stone imitated on the said wax solution coating, filling said mold with cementitious plastic material, pressing the mold and plastic material against the wall surface with sufficient pressure to cause infiltration of a coating of said solution onto the outer surface of the molded plastic material to provide a moisture resistant, protective wax coating, and finally applying slight lateral movement to and immediately removing the mold before the plastic material begins to set.

3. The method of applying a coating of plastic material on a wall surface so as to simulate stone, comprising brushing the interior surface of an imperforate stone shaped mold with a wax solution, sprinkling and adhering marble dust and thereafter streaks of ground up stone particles of the particular stone imitated on the said wax solution coating, filling said mold with cementitious plastic material, pressing the mold and plastic material against the wall surface with sufficient pressure to cause infiltration of a coating of said solution onto the outer surface of the molded plastic material to provide a moisture resistant, protective wax coating, and finally applying slight lateral movement to and immediately removing the mold before the plastic material begins to set and thereafter similarly applying other molded portions in contiguous relationship and succession on said wall surface.

4. The method recited in claim 2 wherein said wax solution comprises melted wax candles dissolved in kerosene in the ratio of about 1 part to 5 parts, by volume, respectively.

ALFRED IEZZI.

REFERENCES CITED

The following references are of record in the file of this patent:

UNITED STATES PATENTS

| Number | Name | Date |
|---|---|---|
| 836,369 | Dexter | Nov. 20, 1906 |
| 1,038,115 | Gillies | Sept. 10, 1912 |
| 1,162,172 | Jones | Nov. 30, 1915 |
| 1,169,985 | Mickelson | Feb. 1, 1916 |
| 1,518,254 | Copeman | Dec. 9, 1924 |
| 1,706,865 | Tucker | Mar. 26, 1929 |
| 1,960,276 | Miller | May 29, 1934 |
| 2,095,641 | Knight | Oct. 12, 1937 |
| 2,095,642 | Knight | Oct. 12, 1937 |
| 2,189,872 | Ulrich | Feb. 13, 1940 |
| 2,433,210 | Gits | Dec. 23, 1947 |
| 2,513,648 | Iezzi | July 4, 1950 |